(12) United States Patent
Toda (10) Patent No.: US 6,343,049 B1
(45) Date of Patent: Jan. 29, 2002

(54) ULTRASONIC TRANSMITTING AND RECEIVING SYSTEM FOR DIGITAL COMMUNICATION

(76) Inventor: Kohji Toda, 1-49-18 Futaba, Yokosuka (JP), 239-0814

( * ) Notice: Subject to any disclaimer, the term of this patent is extended or adjusted under 35 U.S.C. 154(b) by 0 days.

(21) Appl. No.: 09/665,445

(22) Filed: Sep. 19, 2000

(51) Int. Cl.$^7$ ................................................. H04B 1/00

(52) U.S. Cl. .................................. 367/137; 310/313 B (58) Field of Search ................................ 367/135, 137, 367/903; 342/42, 44; 455/39, 41, 91, 73; 310/313 B, 313 C, 313 D, 313 R, 318, 316.01

(56) References Cited

U.S. PATENT DOCUMENTS

| | | | | |
|---|---|---|---|---|
| 4,096,477 A | * | 6/1978 | Epstein et al. | 310/313 B |
| 4,210,900 A | * | 7/1980 | Shavit | 340/543 |
| 5,144,592 A | * | 9/1992 | Bonis | 367/137 |
| 5,815,055 A | * | 9/1998 | Eguchi et al. | 310/313 B |

* cited by examiner

Primary Examiner—Ian J. Lobo (57) ABSTRACT

An ultrasonic transmitting and receiving system for digital communication comprises; a transmitting device including a first piezoelectric substrate, an input IDT, a first electrode-group, and an envelope detecting device; and a receiving device including a second piezoelectric substrate, an output IDT, a second electrode-group, an intermediary IDT, and an output IDT. Two neighbors of interdigital electrode pairs of the input IDT are at a distance L from each other. The first electrode-group consists of interdigital electrodes $A_0$ and $A_1$, at a distance L from each other. The second electrode-group consists of a central interdigital electrode $B_0$, a left interdigital electrode $B_{-1}$ at a distance $L_0$ from the electrode $B_0$, and a right interdigital electrode $B_1$ at a distance $L_0+L$ from the electrode $B_0$. The input- and output IDTs have coded patterns in reverse to each other. If a message digital-signal is applied to the input IDT, a first SAW is excited on the first piezoelectric substrate, and detected as a coded burst-signal at the electrode $A_0$, and then, at the electrode $A_1$ after a time corresponding to the distance L. Thus, a double-coded digital-signal is caused at the envelope detecting device, and delivered into a digital network. If the double-coded digital-signal is received at the electrodes $B_1$ and $B_1$ from the digital network, second- and third SAWs are excited on the second piezoelectric substrate, respectively, and transduced to a monocoded burst-signal at the electrode $B_0$. When the monocoded burst-signal arrives at the intermediary IDT, a fourth SAW is excited on the second piezoelectric substrate. If the fourth SAW corresponds to the first SAW, an output digital-signal equivalent to the message digital-signal is delivered from the output IDT.

11 Claims, 11 Drawing Sheets

ULTRASONIC TRANSMITTING AND RECEIVING SYSTEM FOR DIGITAL COMMUNICATION

BACKGROUND OF THE INVENTION

1. Field of the Invention.

The present invention relates to an ultrasonic transmitting and receiving system for digital communication by means of using a transmitting device including a piezoelectric substrate and an interdigital transducer (IDT) with a coded pattern, and a receiving device including a piezoelectric substrate and an IDT with a coded pattern in reverse to the IDT in the transmitting device.

2. Description of the Prior Art.

Of late years, digitalization techniques on telegraphic communication are in rapid progress. A code division multiple access (CDMA) method is, more especially, powerful for making a transmission speed high in spread spectrum communication. If a surface acoustic wave (SAW) matched filter is incorporated in the CDMA method, it is possible to make the transmission speed still higher. However, it is difficult for a conventional type of CDMA method with the SAW matched filter to realize a base-band communication because of a coded message-signal in condition of a phase shift keying (PSK) burst-signal. In other words, it is necessary to transduce the PSK burst-signal to a digital pulse signal with a high speed for the base-band communication. In order to make the digital pulse signal, the use of a complicated circuit is unavoidable for the conventional type of CDMA method with the SAW matched filter.

SUMMARY OF THE INVENTION

An object of the present invention is to provide an ultrasonic transmitting and receiving system for digital communication comprising a transmitting device and a receiving device.

Another object of the present invention is to provide the transmitting device capable of coding a message digital-signal applied thereto, and delivering a coded digital-signal into a digital network.

Another object of the present invention is to provide the receiving device capable of receiving the coded digital-signal from the digital network, and detecting an output digital-signal corresponding to the message digital-signal.

Another object of the present invention is to provide an ultrasonic transmitting and receiving system for digital communication capable of making the coded digital-signal, in the digital network, play a role as a pseudo noise to keep a base-band communication secret.

Another object of the present invention is to provide the transmitting- and receiving devices capable of recognizing each other in the digital network.

Another object of the present invention is to provide an ultrasonic transmitting and receiving system for digital communication capable of a low electric power consumption.

Another object of the present invention is to provide an ultrasonic transmitting and receiving system for digital communication excellent in durability and manufacturing.

A still other object of the present invention is to provide an ultrasonic transmitting and receiving system for digital communication having a small size which is very light in weight and has a simple structure.

According to one aspect of the present invention there is provided an ultrasonic transmitting and receiving system for digital communication comprising a transmitting device and a receiving device. The transmitting device consists of an input terminal, a first piezoelectric substrate, an input IDT, a first electrode-group, an envelope detecting device, and an output terminal. The receiving device consists of a receiving terminal, a second piezoelectric substrate, a second electrode-group, an intermediary IDT, an output IDT, and a detecting terminal. The input IDT consists of at least three interdigital electrode pairs Pi ($i=1, 2, \ldots, n$), of which two neighbors are at a distance L from each other, and has a coded pattern. The first electrode-group consists of an interdigital electrode $A_0$ and an interdigital electrode $A_i$ ($i=1$) at a distance iL ($i=1$) from the interdigital electrode $A_0$. The input IDT and the first electrode-group are formed on the first piezoelectric substrate. The second electrode-group consists of a central interdigital electrode $B_0$, a left interdigital electrode $B_{-1}$ at a distance $L_0$ from the central interdigital electrode $B_0$, and a right interdigital electrode $B_i$ ($i=1$) at a distance $L_0+iL$ ($i=1$) from the central interdigital electrode $B_0$. The output IDT has a coded pattern in reverse to the input IDT. The second electrode-group, the intermediary IDT, and the output IDT are formed on the second piezoelectric substrate.

When a pulse (1) of a message digital-signal is applied to the input IDT via the input terminal, a first SAW is excited on the first piezoelectric substrate. And then, a coded burst-signal corresponding to the first SAW is detected at the interdigital electrode $A_0$, and the interdigital electrode $A_i$ after a time corresponding to the distance iL. The use of the envelope detecting device causes a double-coded digital-signal from the coded burst-signal at the interdigital electrode $A_0$ and that at the interdigital electrode $A_i$. Thus, the double-coded digital-signal is delivered into a digital network via the output terminal. On the other hand, if the double-coded digital-signal is received at the left interdigital electrode $B_{-1}$ and the right interdigital electrode $B_i$ from the digital network via the receiving terminal, second- and third SAWs are excited on the second piezoelectric substrate, respectively. The second- and third SAWs are transduced to a monocoded burst-signal at the central interdigital electrode $B_0$. When the monocoded burst-signal arrives at the intermediary IDT, a fourth SAW is excited on the second piezoelectric substrate. In this time, if the fourth SAW corresponds to the first SAW, a decoded pulse (1) is detected at the output IDT. Thus, an output digital-signal, which is composed of the decoded pulse (1) and no detected pulse (0), and is equivalent to the message digital-signal, is delivered at the detecting terminal.

According to another aspect of the present invention there are provided input- and output IDTs, of which coded patterns are changed in accordance with a designated time region, respectively.

According to another aspect of the present invention there is provided a transmitting device, wherein a transmitting direction of the second- and third SAWs is orthogonal to that of the fourth SAW.

According to another aspect of the present invention there are provided; a first electrode-group including at least two interdigital electrodes $A_i$ {$i=1, 2, \ldots, (n-1)$} at a distance iL {$i=1, 2, \ldots, (n-1)$}, respectively, from the interdigital electrode $A_0$; and a second electrode-group including at least two right interdigital electrodes $B_i$ {$i=1, 2, \ldots, (n-1)$} at a distance $L_0$ +iL {$i=1, 2, \ldots, (n-1)$}, respectively, from the central interdigital electrode $B_0$. In such arrangements, the interdigital electrodes $A_i$ take turns in connecting with the envelope detecting device, and at the same time, the at right interdigital electrodes $B_i$ take turns in connecting with the receiving terminal.

According to another aspect of the present invention there are provided first- and second piezoelectric substrates made of a piezoelectric ceramic, respectively, the polarization axis thereof being parallel to the thickness direction thereof.

According to another aspect of the present invention there are provided first- and second input IDTs in place of the input IDT, and first- and second output IDTs in place of the output IDT. The first input IDT consists of at least three interdigital electrode pairs Pi (i=1, 2, ..., n), of which two neighbors are at a distance L from each other, and has one coded pattern. The second input IDT consists of at least three interdigital electrode pairs Pi (i=1, 2, ..., n), of which two neighbors are at a distance L from each other, and has the other coded pattern. The first output IDT has a coded pattern in reverse to the first input IDT. The second output IDT has a coded pattern in reverse to the second input IDT.

When pulses (0 and 1) of a message digital-signal are applied to the first-and second input IDTs, respectively, via the input terminal, first- and second SAWs are excited on the first piezoelectric substrate. And then, a coded burst-signal corresponding to the first- and second SAWs, respectively, is detected at the interdigital electrode $A_0$, and the interdigital electrode $A_i$ after a time corresponding to the distance iL. Thus, a double-coded digital-signal is detected at the envelope detecting device from the coded burst-signal at the interdigital electrode $A_0$ and that at the interdigital electrode $A_i$, and delivered into a digital network via the output terminal. On the other hand, if the double-coded digital-signal is received at the left interdigital electrode $B_{-1}$ and the right interdigital electrode $B_i$ from the digital network via the receiving terminal, third- and fourth SAWs are excited on the second piezoelectric substrate, respectively. The third- and fourth SAWs are transduced to a monocoded burst-signal at the central interdigital electrode $B_0$. When the monocoded burst-signal arrives at the intermediary IDT, a fifth SAW is excited on the second piezoelectric substrate. In this time, if the fifth SAW corresponds to the first- and second SAWs, respectively, decoded pulses (0 and 1) are detected at the first- and second output IDTs, respectively. Thus, an output digital-signal, which is based on the decoded pulses (0 and 1) and is equivalent to the message digital-signal, is delivered at the detecting terminal.

According to other aspect of the present invention there are provided first-and second input IDTs, of which each coded pattern is changed in accordance with a designated time region, and in the same time, first- and second output IDTs, of which each coded pattern is changed in accordance with a designated time region.

According to a further aspect of the present invention there is provided an input IDT in place of the first- and second input IDTs. The input IDT has two coded patterns, which are exchanged from each other in response to the pulses (0 and 1) of the message digital-signal applied to the input IDT.

BRIEF DESCRIPTION OF THE DRAWINGS

Other features and advantages of the invention will be clarified from the following description with reference to the attached drawings.

DETAILED DESCRIPTION OF THE PRESENTLY PREFERRED EXEMPLARY EMBODIMENTS

Figure 1:
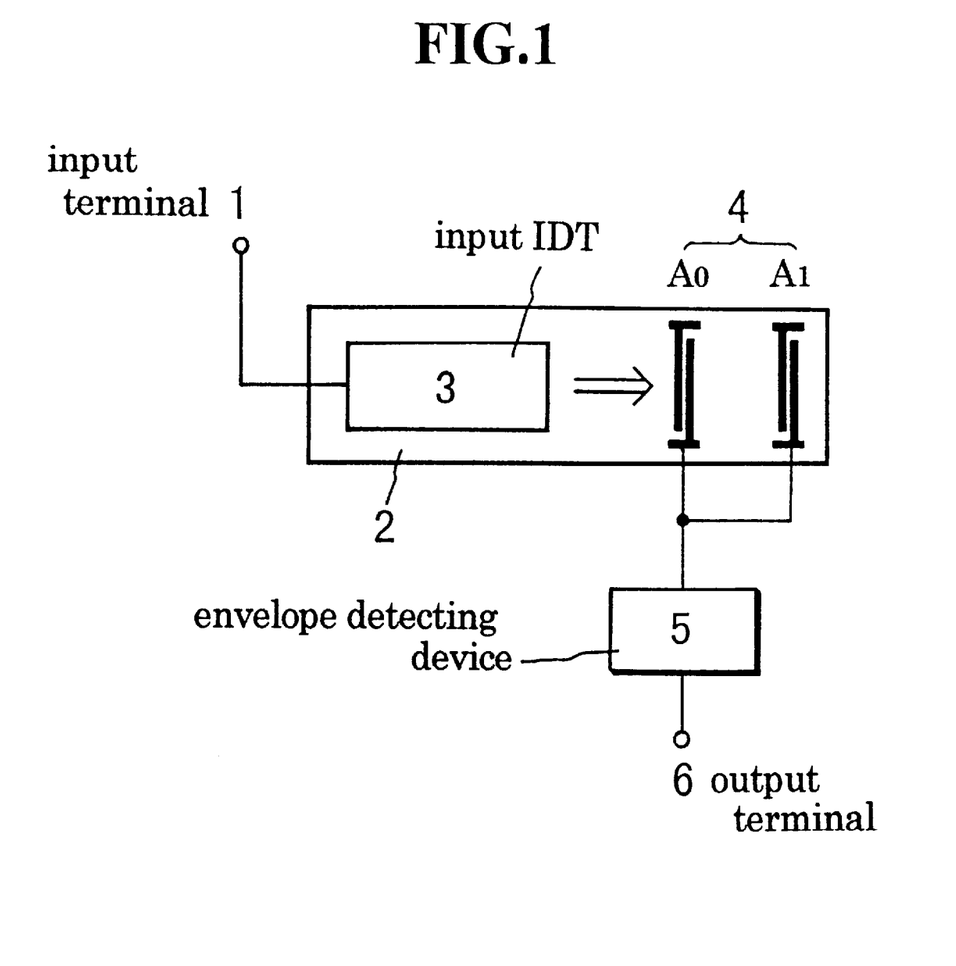
FIG. 1 shows a schematic illustration of a transmitting device, included in an ultrasonic transmitting and receiving system for digital communication, according to a first embodiment of the present invention.

FIG. 1 shows a schematic illustration of a transmitting device, included in an ultrasonic transmitting and receiving system for digital communication, according to a first embodiment of the present invention. The transmitting device comprises input terminal 1, first piezoelectric substrate 2, input IDT 3, first electrode-group 4 consisting of interdigital electrodes $A_0$ and $A_1$, envelope detecting device 5, and output terminal 6. First piezoelectric substrate 2 is made of a piezoelectric ceramic thin plate with a dimension of 200 $\mu$m in thickness, and the polarization axis thereof is parallel to the thickness direction thereof. Input IDT 3 and first electrode-group 4, made of an aluminum thin film, respectively, are formed on first piezoelectric substrate 2. Interdigital electrodes $A_0$ and $A_1$ have an interdigital periodicity of 40 $\mu$m, respectively.

Figure 2:
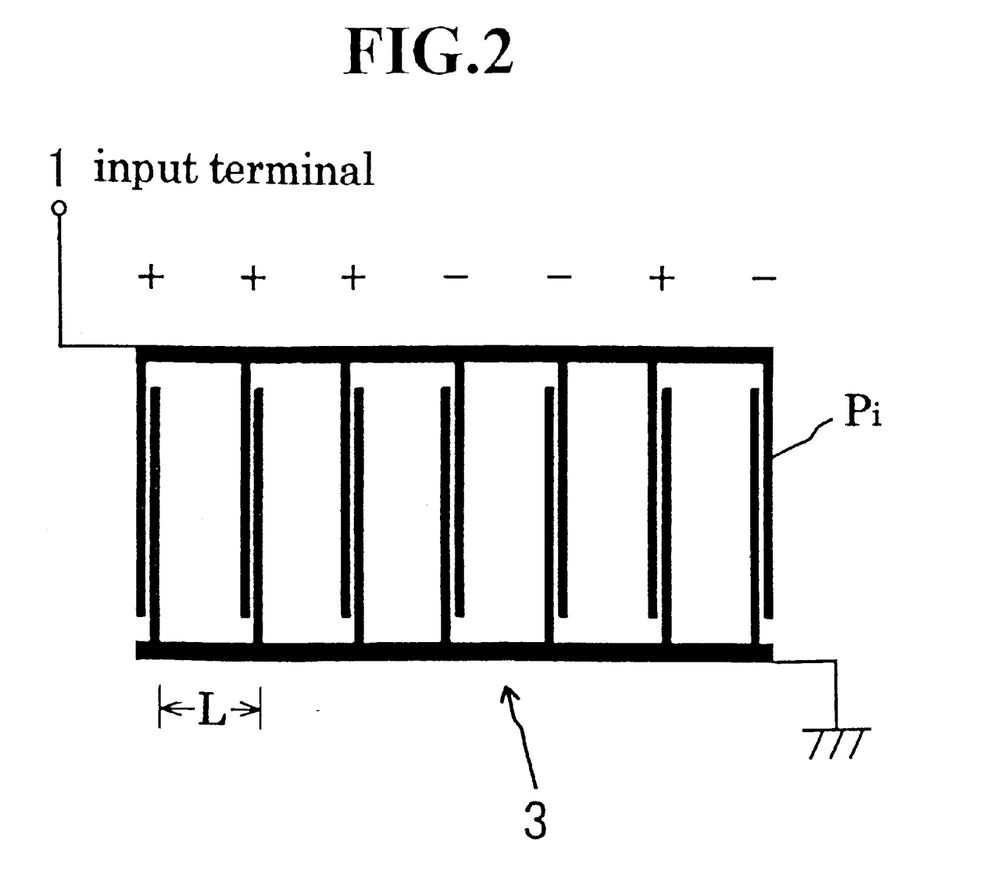
FIG. 2 shows a plan view of input IDT 3 consisting of seven interdigital electrode pairs.

FIG. 2 shows a plan view of input IDT 3 consisting of seven interdigital electrode pairs Pi (i=1, 2, ..., 7), of which two neighbors are at a distance L from each other. A distance between interdigital electrodes $A_0$ and $A_1$ in FIG. 1 is the same as the distance L. Each interdigital electrode pair has an interdigital periodicity of 40 $\mu$m. Input IDT 3 has a coded pattern based on the Baker code. Besides a seven-digits code (1, 1, 1, 0, 0, 1, 0) as shown in FIG. 2, for example, a three-digits code (1, 1, 0), an eleven-digits code (1, 1, 1, 0, 0, 0, 1, 0, 0, 1, 0), and so on are available.

Figure 3:
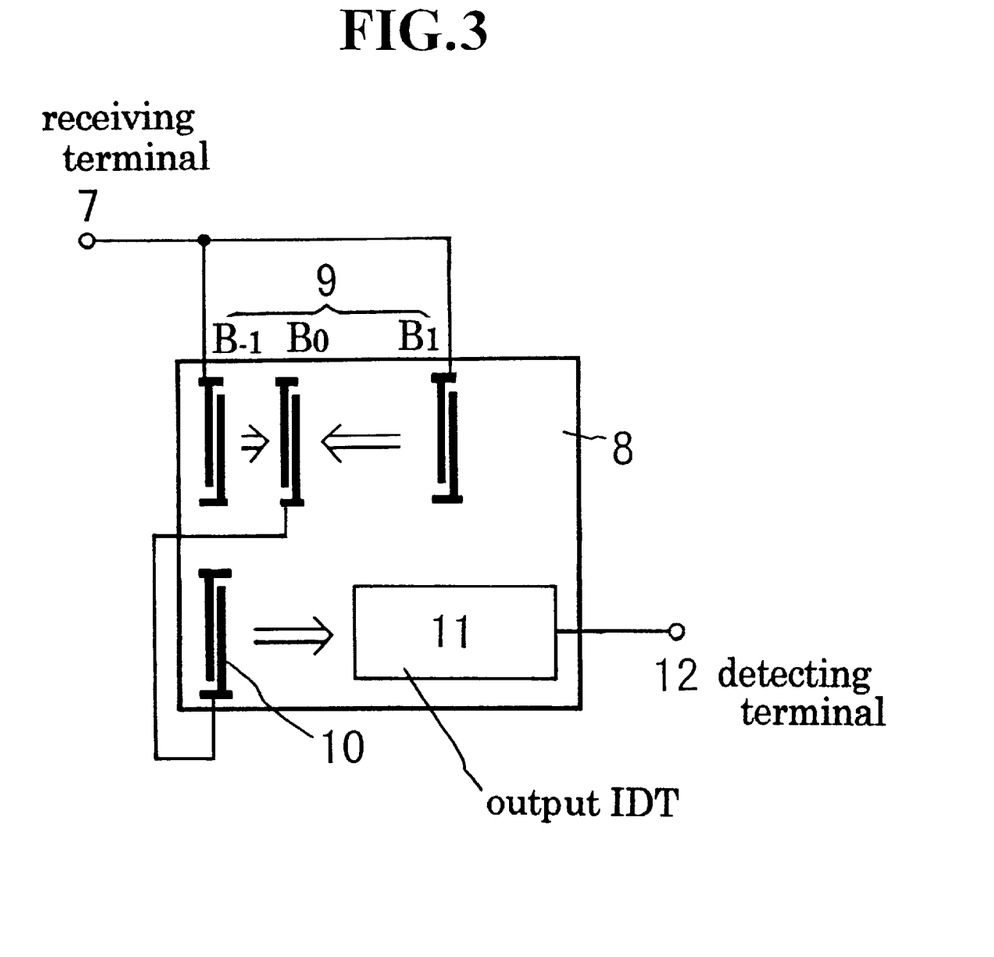
FIG. 3 shows a schematic illustration of a receiving device, included in the ultrasonic transmitting and receiving system for digital communication, according to a first embodiment of the present invention.

FIG. 3 shows a schematic illustration of a receiving device, included in the ultrasonic transmitting and receiving system for digital communication, according to a first embodiment of the present invention. The receiving device comprises receiving terminal 7, second piezoelectric substrate 8, second electrode-group 9 consisting of central interdigital electrode $B_0$, left interdigital electrode $B_{-1}$, and right interdigital electrode $B_1$, intermediary IDT 10, output IDT 11 having a coded pattern in reverse to input IDT 3, and detecting terminal 12. Second piezoelectric substrate 8 is made of a piezoelectric ceramic thin plate with a dimension of 200 μm in thickness, and the polarization axis thereof is parallel to the thickness direction thereof. Second electrode-group 9, intermediary IDT 10, and output IDT 11, made of an aluminum thin film, respectively, are formed on second piezoelectric substrate 8. Left interdigital electrode $B_{-1}$ is at a distance $L_0$ from central interdigital electrode $B_0$. Right interdigital electrode $B_1$ is at a distance $L_0+L$ from central interdigital electrode $B_0$. Central interdigital electrode $B_0$, left interdigital electrode $B_{-1}$, right interdigital electrode $B_1$, intermediary IDT 10, and seven interdigital electrode pairs of output IDT 11 have an interdigital periodicity of 40 μm, respectively.

In the ultrasonic transmitting and receiving system for digital communication composed of the transmitting device in FIG. 1 and the receiving device in FIG. 3, if a message digital-signal composed of pulses (0 and 1) is applied to input terminal 1, only each pulse (1) of the message digital-signal is received at input IDT 3, because each pulse (0) of the message digital-signal can not be essentially detected at any IDT. For example, a message digital-signal (composed of pulses 1, 1, 0, 1, 0, and 1) is applied to input terminal 1, input IDT 3 receives a first pulse (1), a second pulse (1), a little later a third pulse (1), and a little later a fourth pulse (1) in turn. When input IDT 3 receives each pulse (1) of the message digital-signal, a first SAW corresponding to the coded pattern of input IDT 3 is excited on first piezoelectric substrate 2. Because input IDT 3 has seven interdigital electrode pairs, the first SAW is detected as a coded burst-signal, that is, a coded row of seven bursts, at interdigital electrode $A_0$, and after a time corresponding to the distance L, at interdigital electrode $A_1$. The use of envelope detecting device 5 causes a double-coded digital-signal, that is, a double-coded row of digital-pulses, of which each is made from one burst at interdigital electrode $A_0$ and the previous burst at interdigital electrode $A_1$. For example, a third digital-pulse is made from a third burst at interdigital electrode $A_0$ and a second burst at interdigital electrode $A_1$. Thus, the double-coded digital-signal, including eight digital-pulses in all, is delivered from output terminal 6 into a digital network. As a result, it is possible to transmit the message-digital signal as the double-coded digital-signal by using the transmitting device, which has a simple structure and a small size. On the other hand, if the double-coded digital-signal is received at left interdigital electrode $B_{-1}$ and at right interdigital electrode $B_1$ via receiving terminal 7 from the digital network, second- and third SAWs are excited at left interdigital electrode $B_{-1}$ and at right interdigital electrode $B_1$, respectively, on second piezoelectric substrate 8. The second SAW arrives at central interdigital electrode $B_0$ by a time corresponding to the distance L before the third SAW arrives at central interdigital electrode $B_0$. Because both the second- and third SAWs are composed of a row of eight burst waves corresponding to the eight digital-pulses of the double-coded row, one burst wave of the second SAW and the previous burst wave of the third SAW consequently arrive at central interdigital electrode $B_0$ simultaneously. Thus, a first step of a signal decoding is achieved. As a result, the double-coded digital-signal is transduced to a monocoded burst-signal at central interdigital electrode $B_0$. The monocoded burst-signal is applied to intermediary IDT 10, and then, a fourth SAW is excited on second piezoelectric substrate 8. In this time, if the fourth SAW corresponds to the first SAW, a decoded pulse (1) corresponding to the pulse (1) of the message digital-signal is detected at output IDT 11, which has an ability as a SAW matched filter. Thus, a second step of the signal decoding is achieved. In other words, the monocoded burst-signal is transduced to the decoded pulse (1) at output IDT 11. As a result, an output digital-signal, which is composed of the decoded pulse (1) and no detected pulse (0) and is equivalent to the message digital-signal, is delivered from detecting terminal 12. Accordingly, it is possible to detect the message-digital signal at detecting terminal 12 without influence of noises by using the receiving device, which has a simple structure and a small size. In addition, because of a double-coding function of the transmitting device and a double-decoding function of the receiving device, it is possible to make the double-coded digital-signal, in the digital network, play a role as a pseudo noise to keep a base band communication secret. Moreover, it is possible for the transmitting device and the receiving device to recognize each other in the digital network. The incorporation of the SAW devices in the present digital communication system is characterized as follows: (a) real time synchronization, (b) simple system construction.

Figure 4:
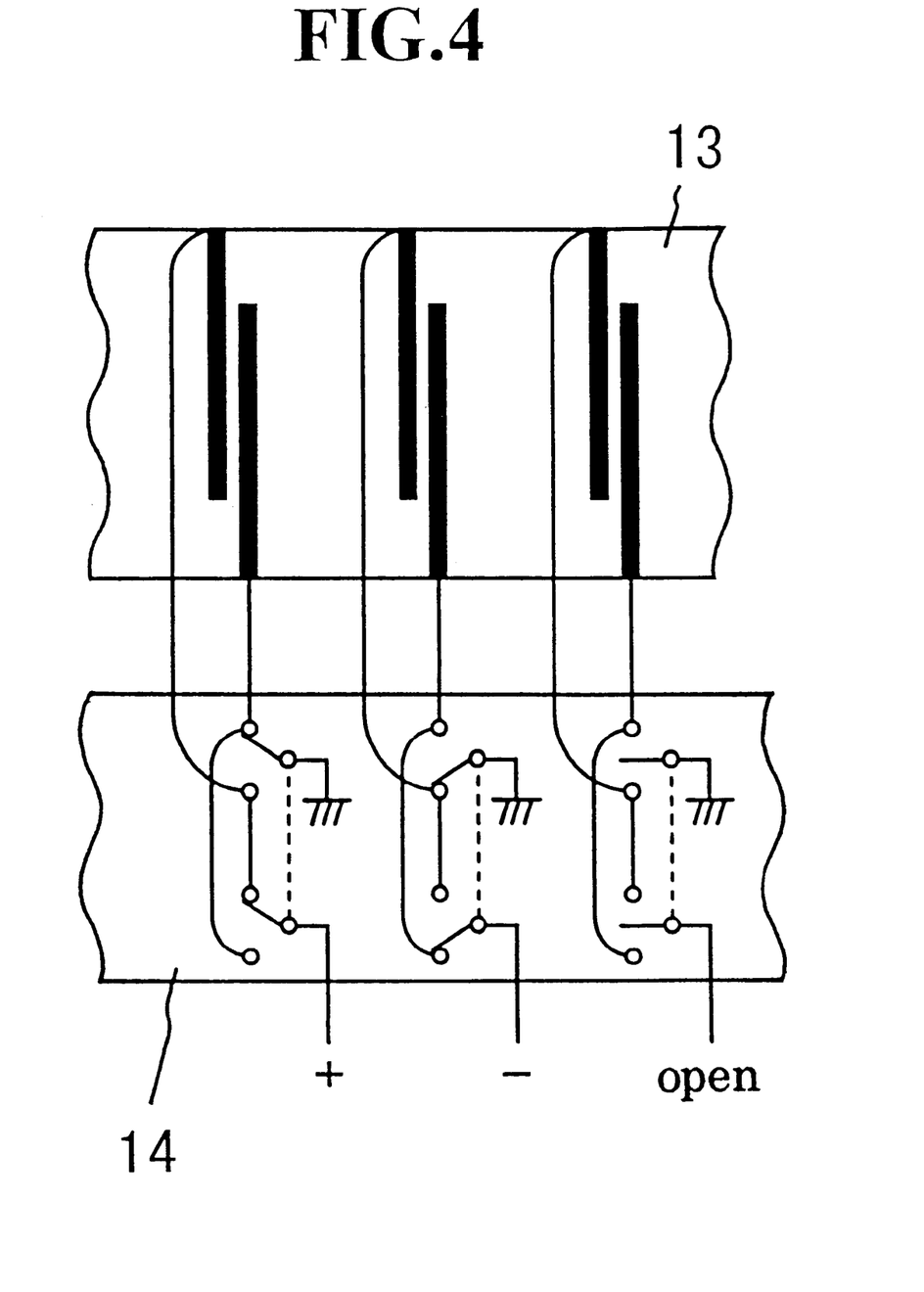
FIG. 4 shows a fragmentary plan view of another input IDT 13, which is used in place of input IDT 3 in FIG. 1.

FIG. 4 shows a fragmentary plan view of another input IDT 13, which is used in place of input IDT 3 in FIG. 1. Input IDT 13 consists of seven interdigital electrode pairs. Each pair has an interdigital periodicity of 40 μm. Input IDT 13 has a coded pattern changed in accordance with a designated time region by using switch 14. At the same time, the coded pattern of output IDT 11 in FIG. 3 is also changed in response to that of input IDT 13. Such a coded-pattern change in accordance with a designated time region keeps a base band communication more secret.

In the receiving device in FIG. 3, a transmitting direction of the second-and third SAWs is parallel to that of the fourth SAW. However, it is possible to arrange intermediary IDT 10 and output IDT 11 in order that the transmitting direction of the second- and third SAWs is orthogonal to that of the fourth SAW.

Figure 5:
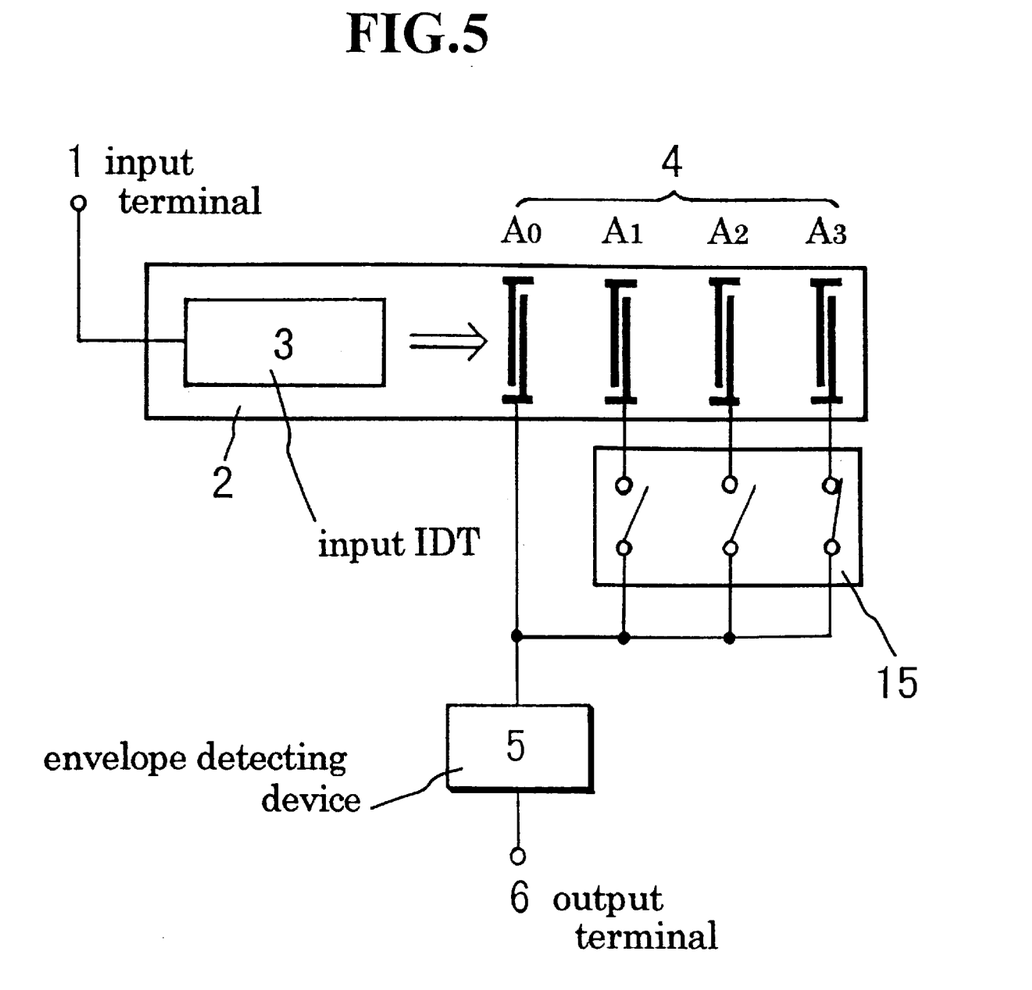
FIG. 5 shows a schematic illustration of a transmitting device according to a second embodiment of the present invention.

FIG. 5 shows a schematic illustration of a transmitting device according to a second embodiment of the present invention. The transmitting device has the same construction as FIG. 1, except for further comprising switch 15, and interdigital electrodes $A_2$ and $A_3$, which are included in first electrode-group 4. A distance between interdigital electrodes $A_1$ and $A_2$, and that between interdigital electrodes $A_2$ and $A_3$, in FIG. 5, is the same as the distance L. Interdigital electrodes $A_2$ and $A_3$ have an interdigital periodicity of 40 μm, respectively.

Figure 6:
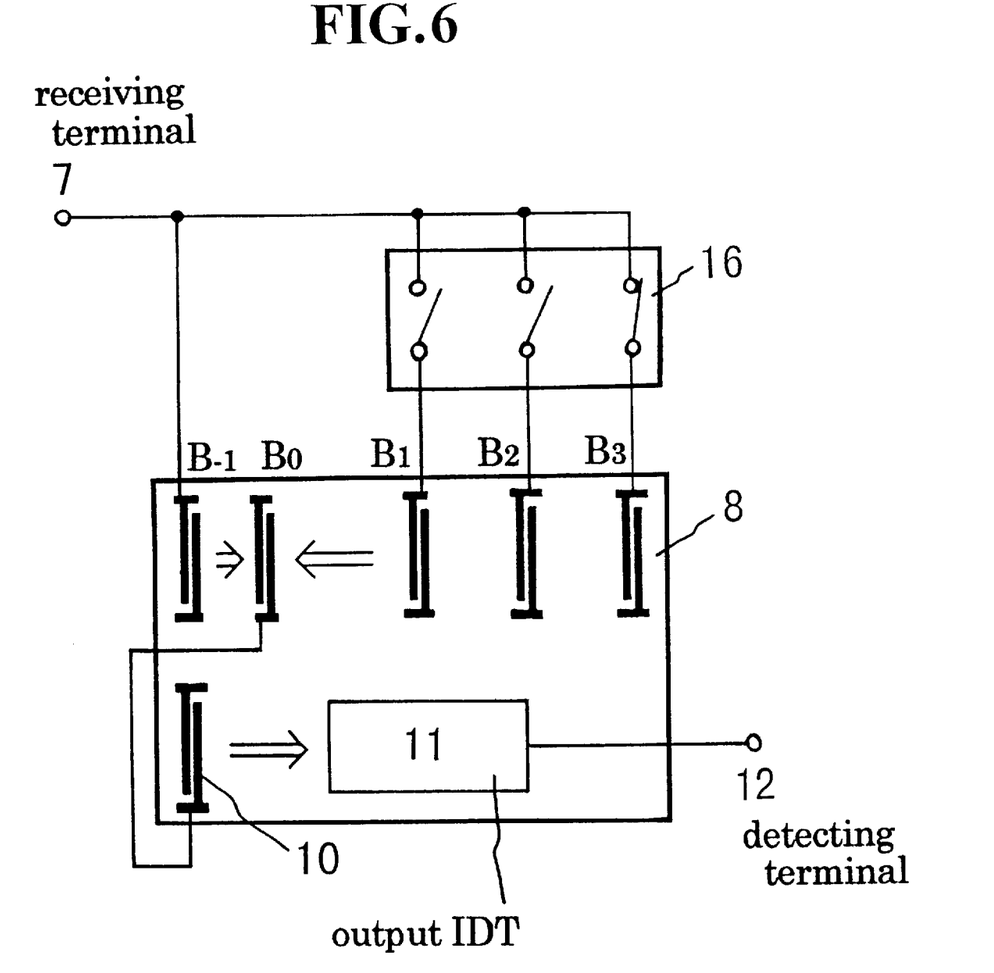
FIG. 6 shows a schematic illustration of a receiving device according to a second embodiment of the present invention.

FIG. 6 shows a schematic illustration of a receiving device according to a second embodiment of the present invention. The receiving device has the same construction as FIG. 3, except for further comprising switch 16, and right interdigital electrodes $B_2$ and $B_3$, which are included in second electrode-group 9. A distance between right interdigital electrodes $B_1$ and $B_2$, and that between right interdigital electrodes $B_2$ and $B_3$, in FIG. 6, is the same as the distance L. Thus, a distance between central interdigital electrodes $B_0$ and right interdigital electrode $B_2$ is $L_0+2L$, and that between central interdigital electrodes $B_0$ and right interdigital electrode $B_3$ is $L_0+3L$. Right interdigital electrodes $B_2$ and $B_3$ have an interdigital periodicity of 40 μm, respectively.

In the ultrasonic transmitting and receiving system for digital communication composed of the transmitting device in FIG. 5 and the receiving device in FIG. 6, if a message digital-signal is applied to input IDT 3 via input terminal 1, a first SAW corresponding to each pulse (1) of the message digital-signal is excited on first piezoelectric substrate 2. The first SAW arrives as a coded burst-signal, that is, a coded row of seven bursts, at interdigital electrode $A_0$, and after a time corresponding to the distances L, 2L and 3L, at interdigital electrodes $A_1$, $A_2$, and $A_3$, respectively. In this time, switch 15 transmits the coded burst-signal at one of interdigital electrodes $A_1$, $A_2$, and $A_3$, to envelope detecting device 5. The use of envelope detecting device 5 causes a double-coded digital-signal, that is, a double-coded row of digital-pulses, of which each is made from an (n)th burst at interdigital electrode $A_0$, and an (n−1)th burst at interdigital electrode $A_1$, or an (n−2)th burst at interdigital electrode $A_2$, or an (n−3)th burst at interdigital electrode $A_3$. For example, a sixth digital-pulse is made from a sixth burst at interdigital electrode $A_0$ and a third burst at interdigital electrode $A_3$. Thus, the double-coded digital-signal, including eight, nine or ten digital-pulses, is delivered from output terminal 6 into a digital network. On the other hand, if the double-coded digital-signal is received at receiving terminal 7 from the digital network, the double-coded digital-signal arrives at left interdigital electrode $B_{-1}$ and at the same time, at one, which is connected to receiving terminal 7 by switch 16, of right interdigital electrodes $B_1$, $B_2$ and $B_3$. Thus, a second SAW is excited at left interdigital electrode $B_{-1}$ on second piezoelectric substrate 8, and a third SAW is excited at one of right interdigital electrodes $B_1$, $B_2$ and $B_3$, on second piezoelectric substrate 8. Central interdigital electrode $B_0$ receives the second SAW, and after a time corresponding to the distance L, 2L or 3L the third SAW. Both the second- and third SAWs are composed of a row of eight, nine or ten burst waves corresponding to the digital-pulses of the double-coded row. Therefore, at the same time that an (n)th burst wave of the second SAW arrives at central interdigital electrode $B_0$, an (n−1)th burst wave of the third SAW at right interdigital electrodes $B_1$, or an (n−2)th burst wave of the third SAW at right interdigital electrodes $B_2$, or an (n−3)th burst wave of the third SAW at right interdigital electrodes $B_3$ consequently arrives at central interdigital electrode $B_0$. For example, a fourth burst wave of the second SAW and a second burst wave of the third SAW at right interdigital electrodes $B_2$ arrive at central interdigital electrode $B_0$ simultaneously. Thus, a first step of a signal decoding is achieved. As a result, the double-coded digital-signal is transduced to a monocoded burst-signal at central interdigital electrode $B_0$. The monocoded burst-signal is applied to intermediary IDT 10, and then, a fourth SAW is excited on second piezoelectric substrate 8. In this time, if the fourth SAW corresponds to the first SAW, a decoded pulse (1) corresponding to the pulse (1) of the message digital-signal is detected at output IDT 11. Thus, a second step of the signal decoding is achieved. In other words, the monocoded burst-signal is transduced to the decoded pulse (1) at output IDT 11. As a result, an output digital-signal, which is composed of the decoded pulse (1) and no detected pulse (0) and is equivalent to the message digital-signal, is delivered from detecting terminal 12.

Figure 7:
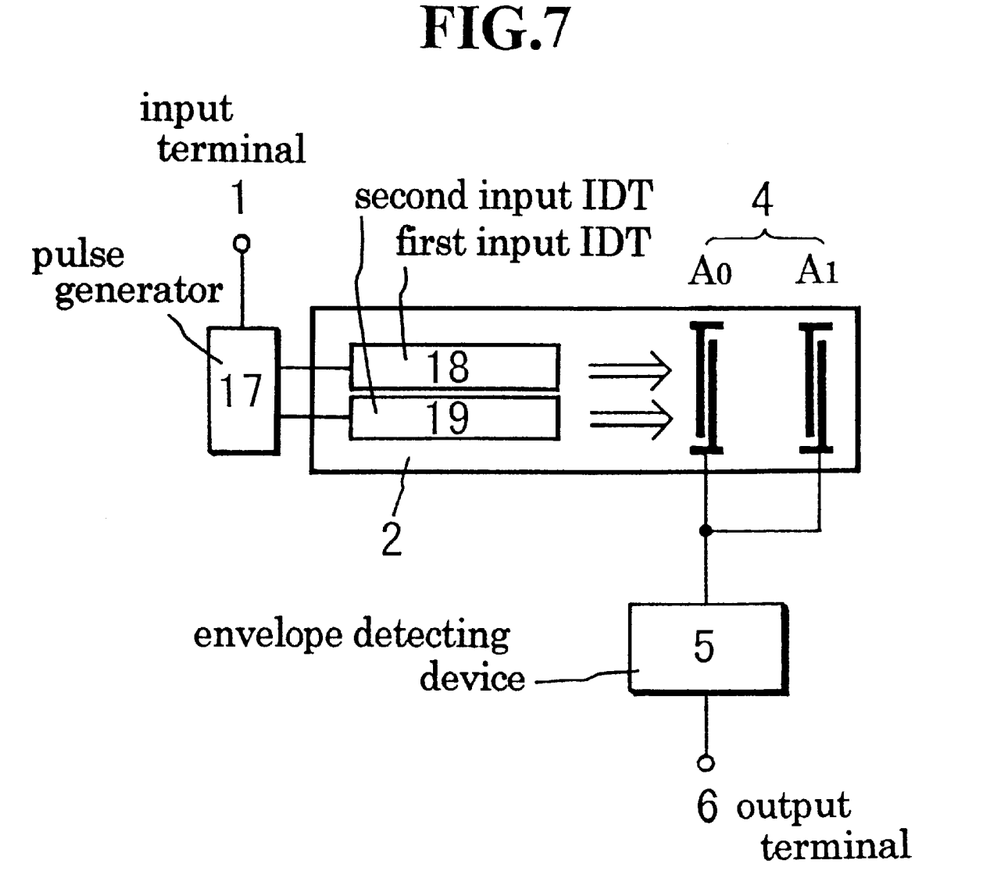
FIG. 7 shows a schematic illustration of a transmitting device according to a third embodiment of the present invention.

FIG. 7 shows a schematic illustration of a transmitting device according to a third embodiment of the present invention. The transmitting device has the same construction as FIG. 1, except for further comprising pulse generator 17 and for using first input IDT 18 and second input IDT 19, in place of input IDT 3. First input IDT 18 has the same construction as input IDT 3. Second input IDT 19 consists of seven interdigital electrode pairs, of which two neighbors are at a distance L from each other. First input IDT 18 has the coded pattern, as shown in FIG. 2. Second input IDT 19 has another coded pattern.

Figure 8:
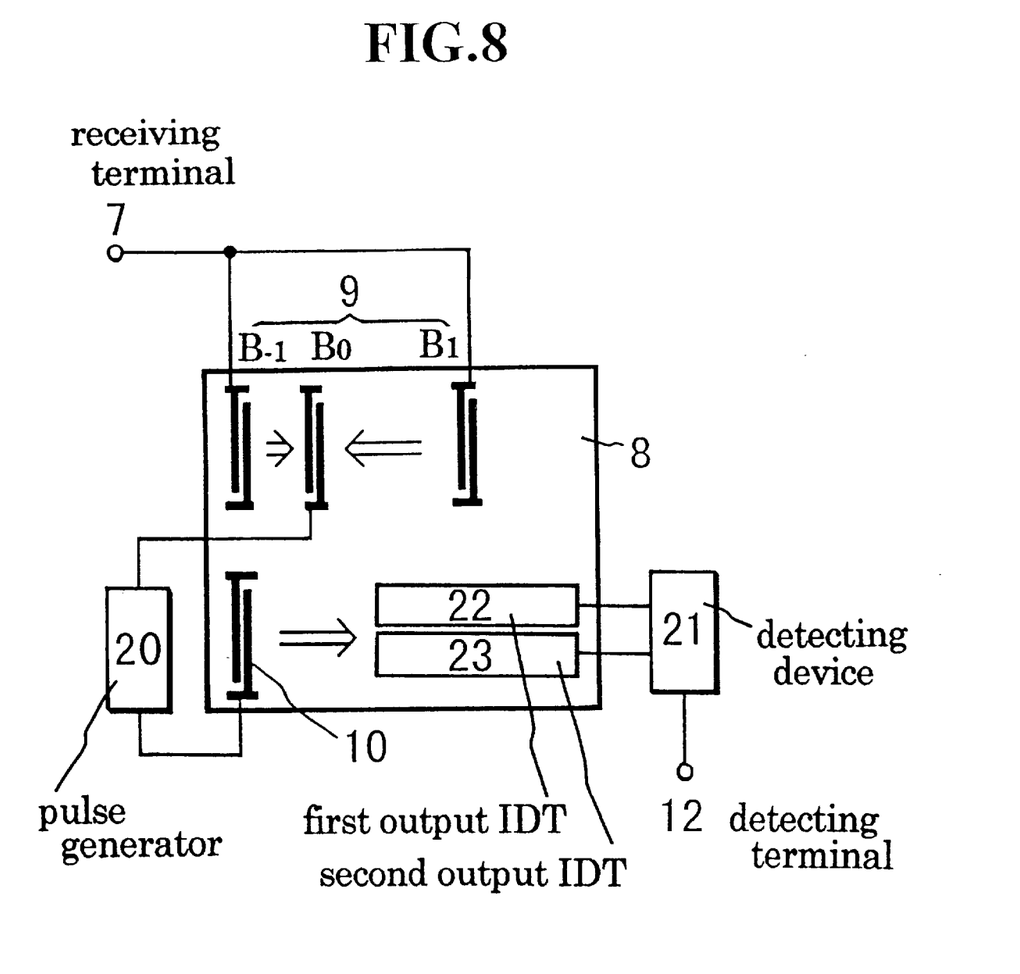
FIG. 8 shows a schematic illustration of a receiving device according to a third embodiment of the present invention.

FIG. 8 shows a schematic illustration of a receiving device according to a third embodiment of the present invention. The receiving device has the same construction as FIG. 3, except for further comprising pulse generator 20 and detecting device 21, and using first output IDT 22 and second output IDT 23, which are in place of output IDT 11. First output IDT 22 and second output IDT 23 consist of seven interdigital electrode pairs, respectively, of which two neighbors are at a distance L from each other. First output IDT 22 has a coded pattern in reverse to first input IDT 18. Second output IDT 23 has a coded pattern in reverse to second input IDT 19.

In the ultrasonic transmitting and receiving system for digital communication composed of the transmitting device in FIG. 7 and the receiving device in FIG. 8, if a message digital-signal is applied to pulse generator 17 via input terminal 1, first- and second timing pulses, which are corresponding to pulses (0 and 1) of the message digital-signal, respectively, are generated. The pulse (0) of the message digital-signal can not be essentially detected at any IDT. Therefore, pulse generator 17 is necessary. Thus, the first- and second timing pulses are sensed by first input IDT 18 and second input IDT 19, respectively. When the first- and second timing pulses are applied to first input IDT 18 and second input IDT 19, respectively, first- and second SAWs corresponding to the coded pattern of first input IDT 18 and second input IDT 19, respectively, are excited on first piezoelectric substrate 2. The first SAW is detected as a first coded burst-signal at interdigital electrode $A_0$, and after a time corresponding to the distance L, at interdigital electrode $A_1$. Thus, a first double-coded digital-signal is delivered, via envelope detecting device 5, from output terminal 6 into a digital network. In the same way, the second SAW is detected as a second coded burst-signal at interdigital electrode $A_0$, and after a time corresponding to the distance L, at interdigital electrode $A_1$. Thus, a second double-coded digital-signal is delivered, via envelope detecting device 5, from output terminal 6 into a digital network. On the other hand, if the first double-coded digital-signal is received at left interdigital electrode $B_{-1}$ and at right interdigital electrode $B_1$ via receiving terminal 7 from the digital network, third- and fourth SAWs are excited at left interdigital electrode $B_{-1}$ and at right interdigital electrode $B_1$ respectively, on second piezoelectric substrate 8. The third- and fourth SAWs are transduced to a first monocoded burst-signal at central interdigital electrode $B_0$. In the same way, if the second double-coded digital-signal is received at left interdigital electrode $B_{-1}$ and at right interdigital electrode $B_1$ via receiving terminal 7 from the digital network, the third- and fourth SAWs are excited at left interdigital electrode $B_{-1}$and at right interdigital electrode $B_1$, respectively, on second piezoelectric substrate 8. The third- and fourth SAWs are transduced to a second monocoded burst-signal at central interdigital electrode $B_0$. Thus, a first step of a signal decoding is achieved. As a result, the first- and second double-coded digital-signals are transduced to first- and second monocoded burst-signals, respectively, at central interdigital electrode $B_0$. The first monocoded burst-signal is applied to pulse generator 20, where third- and fourth timing pulses corresponding to digital pulses (0 and 1), respectively, of the first monocoded burst-signal are generated. In the same way, the second monocoded burst-signal is applied to pulse generator 20, where the third- and fourth timing pulses corresponding to digital pulses (0 and 1), respectively, of the second monocoded burst-signal are generated. When the third- and fourth timing pulses are applied to intermediary IDT 10, a fifth SAW is excited on second piezoelectric substrate 8. In this time, if the fifth SAW corresponds to the first SAW, a decoded pulse (0) corresponding to the pulse (0) of the message digital-signal is detected at first output IDT 22. If the fifth SAW corresponds to the second SAW, a decoded pulse (1) corresponding to the pulse (1) of the message digital-signal is detected at second output IDT 23. Thus, a second step of the signal decoding is achieved. In other words, the first- and second monocoded burst-signals are transduced to the decoded pulse (0) at first output IDT 22 and the decoded pulse (1) at second output IDT 23, respectively. The decoded pulses (0 and 1) are transmitted to detecting device 21, where an output digital-signal, equivalent to the message digital-signal, is constructed from the decoded pulses (0 and 1). The output digital-signal is delivered from detecting terminal 12.

Figure 9:
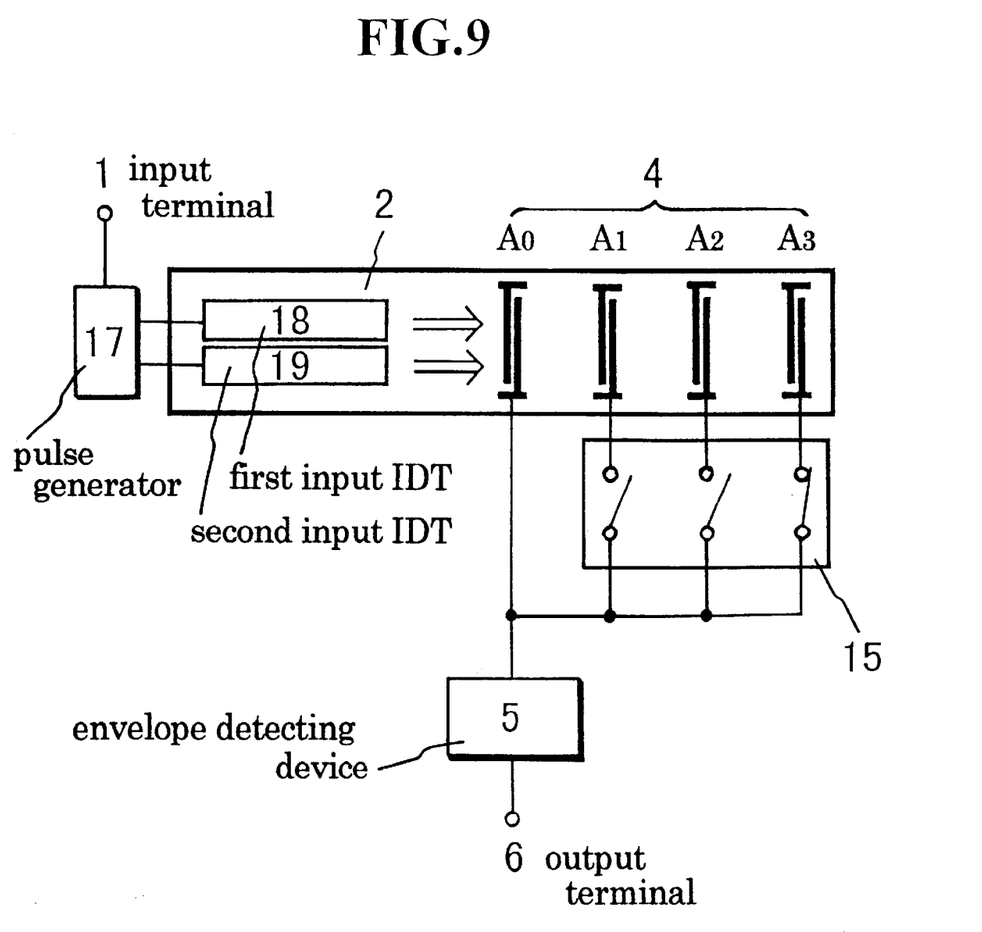
FIG. 9 shows a schematic illustration of a transmitting device according to a fourth embodiment of the present invention.

FIG. 9 shows a schematic illustration of a transmitting device according to a fourth embodiment of the present invention. The transmitting device has the same construction as FIG. 7, except for further comprising switch 15, and interdigital electrodes $A_2$ and $A_3$.

Figure 10:
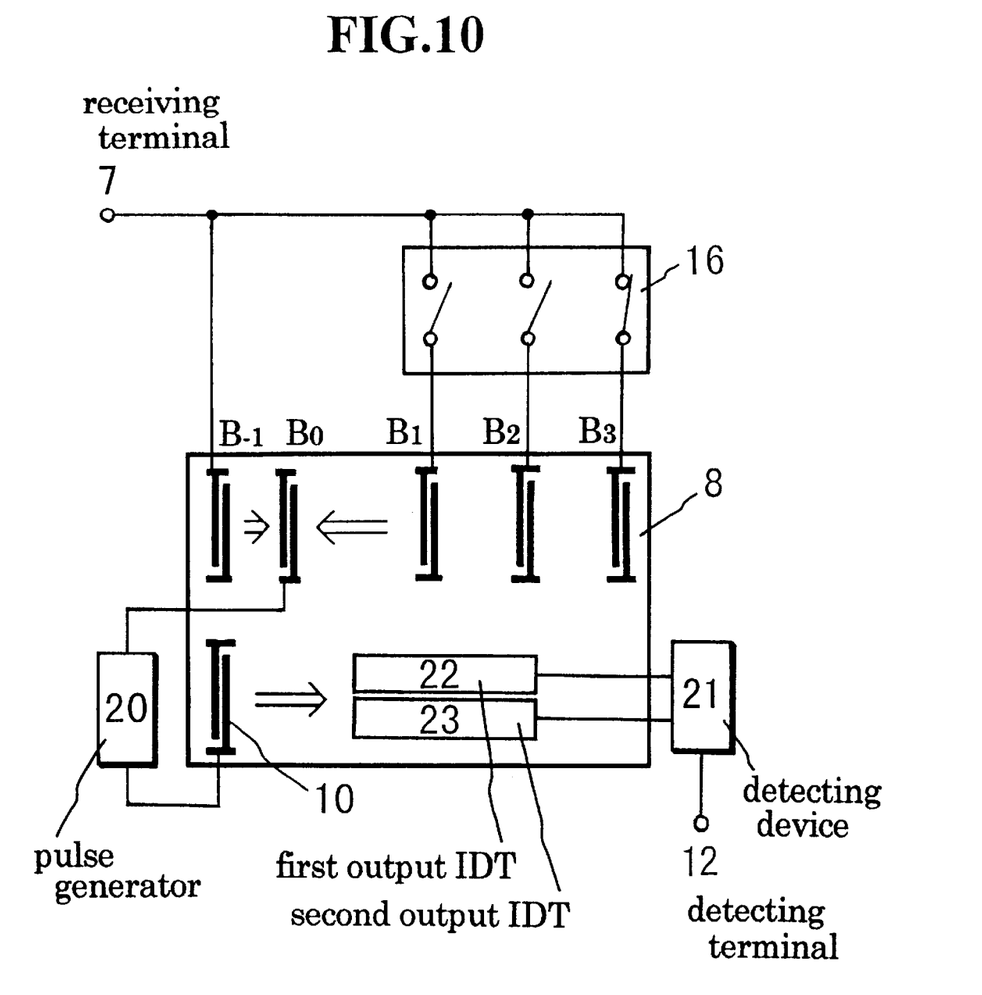
FIG. 10 shows a schematic illustration of a receiving device according to a fourth embodiment of the present invention.

FIG. 10 shows a schematic illustration of a receiving device according to a fourth embodiment of the present invention. The receiving device has the same construction as FIG. 8, except for further comprising switch 16, and right interdigital electrodes $B_2$ and $B_3$.

In the ultrasonic transmitting and receiving system for digital communication composed of the transmitting device in FIG. 9 and the receiving device in FIG. 10, if a message digital-signal is applied to pulse generator 17 via input terminal 1, first- and second timing pulses are generated. When first input IDT 18 receives the first timing pulse, a first SAW corresponding to the coded pattern of first input IDT 18 is excited on first piezoelectric substrate 2. Because switch 15 connects one of interdigital electrodes $A_1$, $A_2$, and $A_3$, with envelope detecting device 5, the first SAW is detected as a first coded burst-signal at interdigital electrode $A_0$, and after a time corresponding to the distance L, 2L or 3L, at interdigital electrode $A_1$, $A_2$, or $A_3$, respectively. Thus, a first double-coded digital-signal is delivered, via envelope detecting device 5, from output terminal 6 into a digital network. In the same way, when second input IDT 19 receives the second timing pulse, a second SAW corresponding to the coded pattern of second input IDT 19 is excited on first piezoelectric substrate 2. The second SAW is detected as a second coded burst-signal at interdigital electrode $A_0$, and after a time corresponding to the distance L, 2L or 3L, at interdigital electrode $A_1$, $A_2$, or $A_3$, respectively. Thus, a second double-coded digital-signal is delivered, via envelope detecting device 5, from output terminal 6 into a digital network. On the other hand, if the first double-coded digital-signal is received at receiving terminal 7 from the digital network, the first double-coded digital-signal arrives at left interdigital electrode $B_{-1}$ and at the same time, at one, which is connected to receiving terminal 7 by switch 16, of right interdigital electrodes $B_1$, $B_2$ and $B_3$. Thus, third- and fourth SAWs are excited at left interdigital electrode $B_{-1}$ and at one of right interdigital electrodes $B_1$, $B_2$ and $B_3$, respectively, on second piezoelectric substrate 8. Central interdigital electrode $B_0$ receives the third SAW, and after a time corresponding to the distance L, 2L or 3L the fourth SAW. Thus, the third- and fourth SAWs are transduced to a first monocoded burst-signal at central interdigital electrode $B_0$. In the same way, if the second double-coded digital-signal is received at receiving terminal 7 from the digital network, the second double-coded digital-signal arrives at left interdigital electrode $B_{-1}$ and at the same time, at one, which is connected to receiving terminal 7 by switch 16, of right interdigital electrodes $B_1$, $B_2$ and $B_3$. Thus, the third- and fourth SAWs are excited at left interdigital electrode $B_{-1}$ and at one of right interdigital electrodes $B_1$, $B_2$ and $B_3$, respectively, on second piezoelectric substrate 8. Central interdigital electrode $B_0$ receives the third SAW, and after a time corresponding to the distance L, 2L or 3L the fourth SAW. Thus, the third- and fourth SAWs are transduced to a second monocoded burst-signal at central interdigital electrode $B_0$. As a result, a first step of a signal decoding is achieved. The first monocoded burst-signal is applied to pulse generator 20, where third- and fourth timing pulses corresponding to digital pulses (0 and 1), respectively, of the first monocoded burst-signal are generated. In the same way, the second monocoded burst-signal is applied to pulse generator 20, where the third- and fourth timing pulses corresponding to digital pulses (0 and 1), respectively, of the second monocoded burst-signal are generated. When the third- and fourth timing pulses are applied to intermediary IDT 10, a fifth SAW is excited on second piezoelectric substrate 8. In this time, if the fifth SAW corresponds to the first SAW, a decoded pulse (0) corresponding to the pulse (0) of the message digital-signal is detected at first output IDT 22. If the fifth SAW corresponds to the second SAW, a decoded pulse (1) corresponding to the pulse (1) of the message digital-signal is detected at second output IDT 23. Thus, a second step of the signal decoding is achieved. In other words, the first- and second monocoded burst-signals are transduced to the decoded pulse (0) at first output IDT 22 and the decoded pulse (1) at second output IDT 23, respectively. The decoded pulses (0 and 1) are transmitted to detecting device 21, where an output digital-signal, equivalent to the message digital-signal, is constructed from the decoded pulses (0 and 1). The output digital-signal is delivered from detecting terminal 12.

Figure 11:
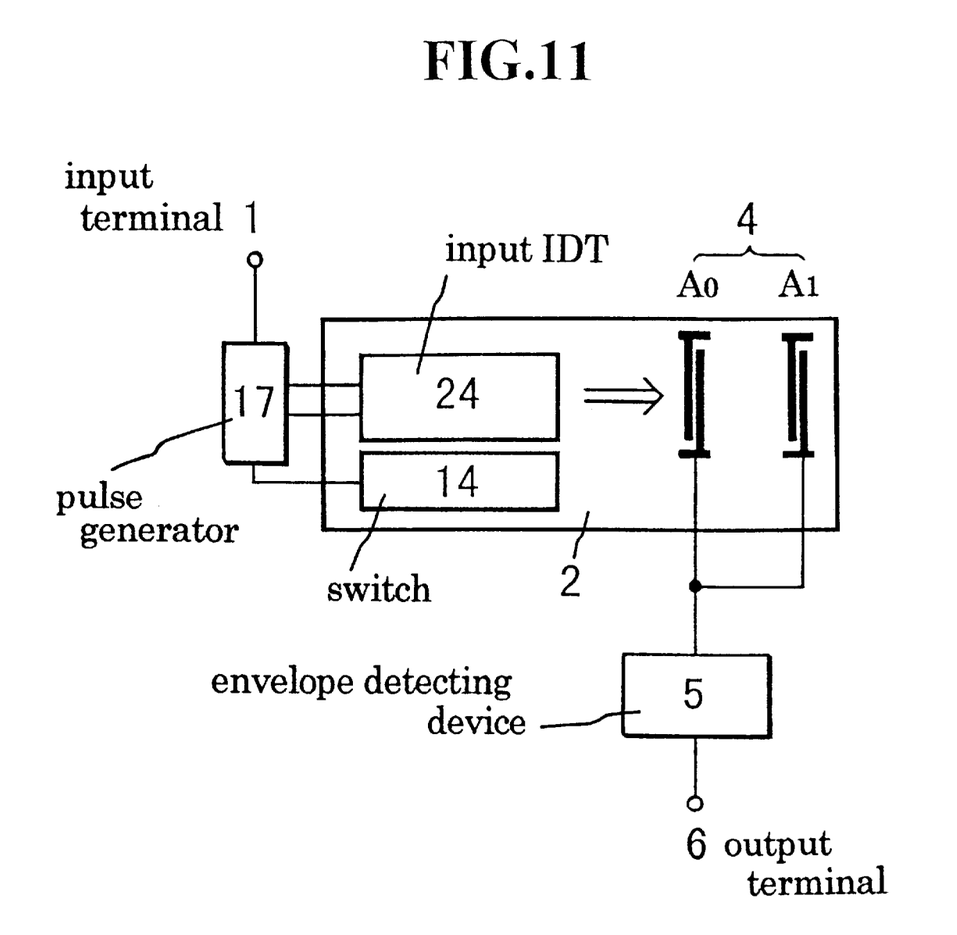
FIG. 11 shows a schematic illustration of a transmitting device according to a fifth embodiment of the present invention.

FIG. 11 shows a schematic illustration of a transmitting device according to a fifth embodiment of the present invention. The transmitting device has the same construction as FIG. 9, except for further comprising input IDT 24 in place of first input IDT 18 and second input IDT 19. Input IDT 24, consisting of seven interdigital electrode pairs, has two coded patterns, which are exchanged from each other, by switch 14 shown in FIG. 4, in response to pulses (0 and 1) of a message digital-signal applied to input IDT 24.

In the ultrasonic transmitting and receiving system for digital communication composed of the transmitting device in FIG. 11 and the receiving device in FIG. 10, if a message digital-signal is applied to pulse generator 17 via input terminal 1, first- and second timing pulses are generated. When the first- and second timing pulses arrive at input IDT 24 respectively, the interdigital electrode pairs of input IDT 24 are reconstructed to have one-and the other coded patterns, respectively. Thus, input IDT 24 receives the first- and second timing pulses, respectively, and in this time, first- and second SAWs are excited on first piezoelectric substrate 2, respectively. Therefore, the use of input IDT 24 brings about the same coding effect as that of first input IDT 18 and second input IDT 19.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. An ultrasonic transmitting and receiving system for digital communication comprising:

a transmitting device consisting of:
an input terminal,
a first piezoelectric substrate, an input IDT consisting of at least three interdigital electrode pairs Pi (i=1, 2, . . . , n), of which two neighbors are at a distance L from each other, and having a coded pattern, a first electrode-group consisting of an interdigital electrode $A_0$ and an interdigital electrode $A_i$ (i=1) at a distance iL (i=1) from said interdigital electrode $A_0$, said input IDT and said first electrode-group being formed on said first piezoelectric substrate, an envelope detecting device, an output terminal; and a receiving device consisting of:

a receiving terminal, a second piezoelectric substrate, a second electrode-group consisting of a central interdigital electrode $B_0$, a left interdigital electrode $B_{-1}$ at a distance $L_0$ from said central interdigital electrode $B_0$, and a right interdigital electrode $B_i$ (i=1) at a distance $L_0+iL$ (i=1) from said central interdigital electrode $B_0$, an intermediary IDT, an output IDT having a coded pattern in reverse to said input IDT, said second electrode-group, said intermediary IDT, and said output IDT being formed on said second piezoelectric substrate, and a detecting terminal, said input IDT exciting a first SAW on said first piezoelectric substrate when receiving a pulse (1) of a message digital-signal via said input terminal, said interdigital electrode $A_0$ detecting a coded burst-signal corresponding to said first SAW, said interdigital electrode $A_i$ detecting said coded burst-signal after a time corresponding to said distance iL, said envelope detecting device causing a double-coded digital-signal from said coded burst-signal at said interdigital electrode $A_0$ and that at said interdigital electrode $A_i$, said output terminal delivering said double-coded digital-signal into a digital network, said left interdigital electrode $B_{-1}$ and said right interdigital electrode $B_i$ exciting second- and third SAWs on said second piezoelectric substrate, respectively, when receiving said double-coded digital-signal from said digital network via said receiving terminal, said central interdigital electrode $B_0$ transducing said second- and third SAWs to a monocoded burst-signal, said intermediary IDT exciting a fourth SAW on said second piezoelectric substrate when receiving said monocoded burst-signal, said output IDT delivering a decoded pulse (1), if said fourth SAW corresponds to said first SAW, said detecting terminal detecting an output digital-signal, which is composed of said decoded pulse (1) and no detected pulse (0), and is equivalent to said message digital-signal.

2. An ultrasonic transmitting and receiving system for digital communication as defined in claim 1, wherein said coded pattern of said input- and output IDTs, respectively, is changed in accordance with a designated time region.

3. An ultrasonic transmitting and receiving system for digital communication as defined in claim 1, wherein a transmitting direction of said second- and third SAWs is orthogonal to that of said fourth SAW.

4. An ultrasonic transmitting and receiving system for digital communication as defined in claim 1, wherein said first electrode-group includes at least two interdigital electrodes $A_i$ {i=1, 2, . . . , (n−1)} at a distance iL {i=1, 2, . . . , (n−1)}, respectively, from said interdigital electrode $A_0$, said second electrode-group includes at least two right interdigital electrodes $B_i$ {i=1, 2, . . . , (n−1)} at a distance $L_0+iL$ {i=1, 2, . . . , (n−1)}, respectively, from said central interdigital electrode $B_0$, said at least two interdigital electrodes $A_i$ take turns in connecting with said envelope detecting device, and at the same time, said at least two right interdigital electrodes $B_i$ take turns in connecting with said receiving terminal.

5. An ultrasonic transmitting and receiving system for digital communication as defined in claim 1, wherein said first- and second piezoelectric substrates are made of a piezoelectric ceramic, respectively, the polarization axis thereof being parallel to the thickness direction thereof.

6. An ultrasonic transmitting and receiving system for digital communication comprising:

a transmitting device consisting of:

an input terminal, a first piezoelectric substrate, a first input IDT consisting of at least three interdigital electrode pairs Pi (i=1, 2, . . . , n), of which two neighbors are at a distance L from each other, and having one coded pattern, a second input IDT consisting of at least three interdigital electrode pairs Pi (i=1, 2, . . . , n), of which two neighbors are at a distance L from each other, and having the other coded pattern, a first electrode-group consisting of an interdigital electrode $A_0$ and an interdigital electrode $A_i$ (i=1) at a distance iL (i=1) from said interdigital electrode $A_0$, said first- and second input IDTs and said first electrode-group being formed on said first piezoelectric substrate, an envelope detecting device, an output terminal; and a receiving device consisting of:

a receiving terminal, a second piezoelectric substrate, a second electrode-group consisting of a central interdigital electrode $B_0$, a left interdigital electrode $B_{-1}$ at a distance $L_0$ from said central interdigital electrode $B_0$, and an interdigital electrode $B_i$ (i=1) at a distance $L_0+iL$ (i=1) from said central interdigital electrode $B_0$, an intermediary IDT, a first output IDT having a coded pattern in reverse to said first input IDT, a second output IDT having a coded pattern in reverse to said second input IDT, said second electrode-group, said intermediary IDT, and said first- and second output IDTs being formed on said second piezoelectric substrate, and a detecting terminal, said first- and second input IDTs exciting first- and second SAWs, respectively, on said first piezoelectric substrate when receiving pulses (0 and 1), respectively, of a message digital-signal via said input terminal, said interdigital electrode $A_0$ detecting a coded burst-signal corresponding to said first- and second SAWs, respectively, said interdigital electrode $A_i$ detecting said coded burst-signal after a time corresponding to said distance iL, said envelope detecting device causing a double-coded digital-signal from said coded burst-signal at said interdigital electrode $A_0$ and that at said interdigital electrode $A_i$, said output terminal delivering said double-coded digital-signal into a digital network, said receiving terminal receiving said double-coded digital-signal from said digital network, said left interdigital electrode $B_{-1}$ and said right interdigital electrode $B_i$ exciting third- and fourth SAWs, respectively, on said second piezoelectric substrate when receiving said double-coded digital-signal, said central interdigital electrode $B_0$ transducing said third- and fourth SAWs to a monocoded burst-signal, said intermediary IDT exciting a fifth SAW on said second piezoelectric substrate when receiving said monocoded burst-signal, said first- and second output IDTs delivering decoded pulses (0 and 1), respectively, if said fifth SAW corresponds to said first- and second SAWs, respectively, said detecting terminal detecting an output digital-signal, which is based on said decoded pulses (0 and 1) and is equivalent to said message digital-signal.

7. An ultrasonic transmitting and receiving system for digital communication as defined in claim 6, wherein said first- and second piezoelectric substrates are made of a piezoelectric ceramic, respectively, the polarization axis thereof being parallel to the thickness direction thereof.

8. An ultrasonic transmitting and receiving system for digital communication as defined in claim 6, wherein a transmitting direction of said third- and fourth SAWs is orthogonal to that of said fifth SAW.

9. An ultrasonic transmitting and receiving system for digital communication as defined in claim 6, wherein said coded pattern of said first- and second input IDTs, respectively, is changed in accordance with a designated time region, and at the same time, said coded pattern of said first- and second output IDTs, respectively, is also changed in response to a changed coded pattern of said first- and second input IDTs, respectively.

10. An ultrasonic transmitting and receiving system for digital communication as defined in claim 6, wherein said first electrode-group includes at least two interdigital electrodes $A_i$ {i=1, 2, ..., (n−1)} at a distance iL {i=1, 2, ..., (n−1)}, respectively, from said interdigital electrode $A_0$, said second electrode-group includes at least two right interdigital electrodes $B_i$ {i=1, 2, ..., (n−1)} at a distance $L_0$+iL {i=1, 2, ..., (n−1)}, respectively, from said central interdigital electrode $B_0$, said at least two interdigital electrodes $A_i$ take turns in connecting with said envelope detecting device, and at the same time, said at least two right interdigital electrodes $B_i$ take turns in connecting with said receiving terminal.

11. An ultrasonic transmitting and receiving system for digital communication as defined in claim 6 further comprising an input IDT in place of said first- and second input IDTs, said input IDT having two coded patterns, which are exchanged from each other in response to said pulses (0 and 1) of said message digital-signal applied to said input IDT.

* * * * *